United States Patent
Ito

(10) Patent No.: US 7,409,277 B2
(45) Date of Patent: Aug. 5, 2008

(54) DRIVING CIRCUIT FOR CREW PROTECTING SYSTEM

(75) Inventor: Masahiko Ito, Anjo (JP)

(73) Assignee: Denso Corporation, Kariya (JP)

( * ) Notice: Subject to any disclaimer, the term of this patent is extended or adjusted under 35 U.S.C. 154(b) by 353 days.

(21) Appl. No.: 11/385,003

(22) Filed: Mar. 20, 2006

(65) Prior Publication Data

US 2006/0217863 A1    Sep. 28, 2006

(30) Foreign Application Priority Data

Mar. 23, 2005  (JP) .............................. 2005-084858

(51) Int. Cl.
*B60R 21/16*  (2006.01)
(52) U.S. Cl. ........................ 701/45; 280/735
(58) Field of Classification Search ..................... 701/45
See application file for complete search history.

(56) References Cited

U.S. PATENT DOCUMENTS

| 3,945,459 | A | * | 3/1976 | Oishi et al. ................. 180/274 |
| 5,182,459 | A | * | 1/1993 | Okano et al. ............... 307/10.1 |
| 5,420,790 | A | * | 5/1995 | Ravas et al. .................... 701/45 |
| 5,701,038 | A | * | 12/1997 | Kincaid ...................... 307/10.1 |
| 5,872,460 | A | * | 2/1999 | Bennett et al. .............. 324/769 |
| 6,037,674 | A | * | 3/2000 | Hargedon et al. .......... 307/10.1 |
| 6,157,246 | A | * | 12/2000 | Saitou et al. ................. 327/540 |
| 6,185,488 | B1 | * | 2/2001 | Nomoto ........................ 701/29 |
| 6,426,567 | B2 | * | 7/2002 | Ugusa et al. ............... 307/10.1 |
| 7,009,368 | B2 | * | 3/2006 | Mayumi ..................... 323/222 |
| 7,285,939 | B2 | * | 10/2007 | Ito .............................. 323/222 |
| 2004/0174649 | A1 | * | 9/2004 | Ito ............................. 361/91.1 |
| 2005/0179424 | A1 | * | 8/2005 | Mayumi ..................... 323/282 |
| 2005/0206361 | A1 | * | 9/2005 | Ito .............................. 323/282 |
| 2006/0217863 | A1 | * | 9/2006 | Ito ............................... 701/45 |

FOREIGN PATENT DOCUMENTS

| JP | 06-055995 | 3/1994 |
| JP | 06-072280 | 3/1994 |

* cited by examiner

*Primary Examiner*—Thomas G. Black
*Assistant Examiner*—Shelley Chen
(74) *Attorney, Agent, or Firm*—Harness, Dickey & Pierce, PLC

(57) ABSTRACT

A driving circuit for a crew protection device to be mounted in a vehicle includes a squib for operating the protection device when a preset amount of electric current is supplied thereto from the DC power source, a pair of first and second transistors connected between the squib and the DC power source, and a transistor control circuit. The transistor control circuit controls the first transistor to pass a first preset amount of electric current if output voltage of the DC power source is higher than a first threshold voltage and to pass an amount of electric current so that the voltage across the first transistor can be set to be lower than a second threshold voltage if output voltage of the DC power source becomes higher than the threshold voltage.

7 Claims, 1 Drawing Sheet

FIGURE
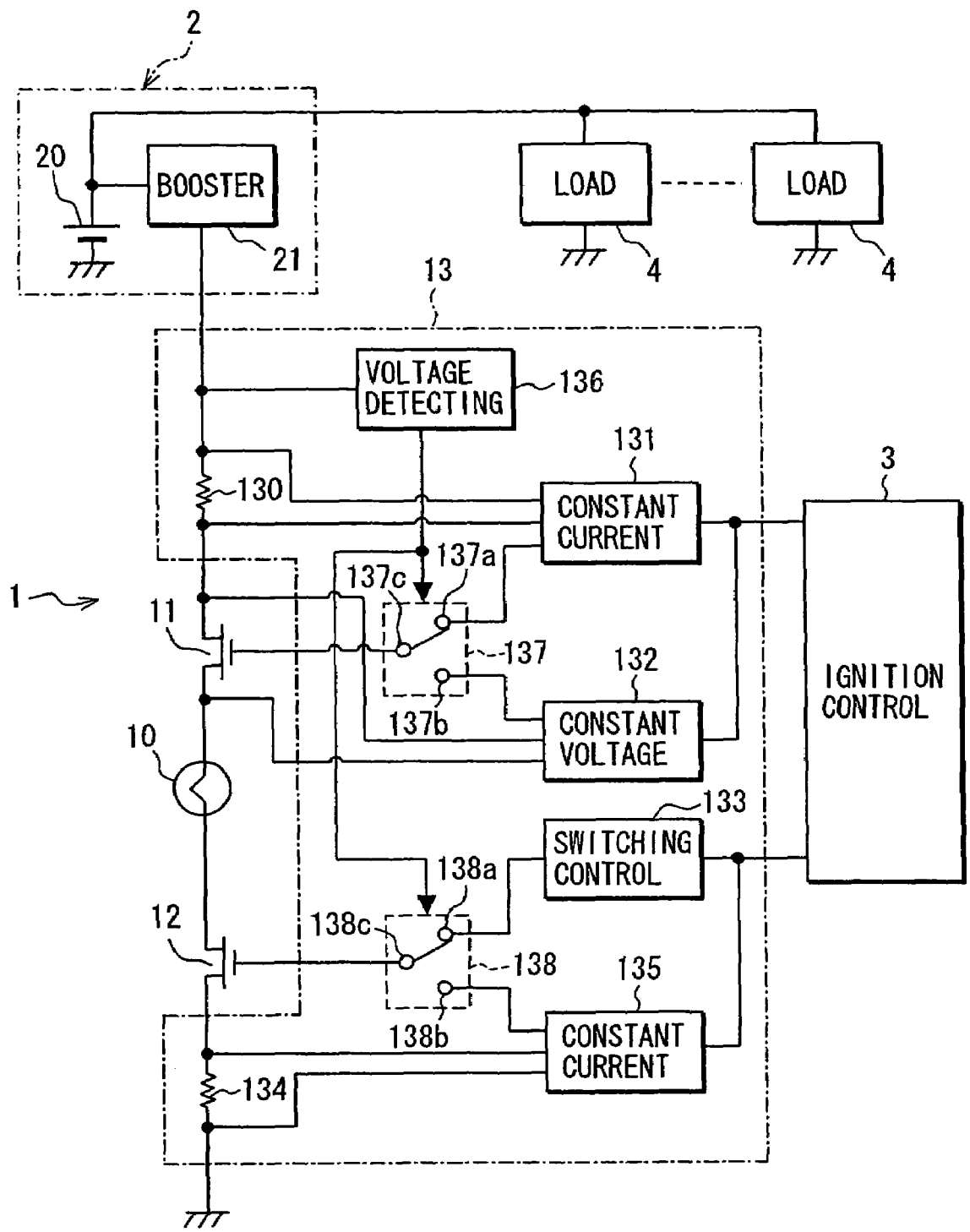

DRIVING CIRCUIT FOR CREW PROTECTING SYSTEM

CROSS REFERENCE TO RELATED APPLICATION

The present application is based on and claims priority from Japanese Patent Application 2005-84858, filed Mar. 23, 2005, the contents of which are incorporated herein by reference.

BACKGROUND OF THE INVENTION

1. Field of the Invention

The present invention relates to a driving circuit for a vehicle crew protecting device.

2. Description of the Related Art

An airbag system is well known for a crew protecting device. If a vehicle equipped with an airbag system has a collision, an airbag is inflated by an airbag driving circuit (or an ignition device) to protect a crew, such as disclosed in JP-A-11-70850 or its counterpart U.S. Pat. No. 6,157,246.

The airbag driving circuit includes a mechanical collision detecting sensor, a constant current circuit, a squib, an igniting power transistor, etc. The constant current circuit is a current mirror circuit that is constituted of a current detecting MOS transistor and a current supplying MOS transistor. The source of the current supplying MOS transistor is connected to one end of the squib, and the drain thereof is connected, via the mechanical collision sensor, to a booster circuit for boosting battery voltage. The other end of the squib is connected to the drain of the ignition power transistor, whose source is grounded. The gate of the ignition power transistor is connected to a collision sensing unit.

When a vehicle equipped with such an airbag system has a collision, a wire that connects electric loads and a battery may snap off due to a collision shock. Accordingly, power consumption of the vehicle abruptly reduces, so that the terminal voltage of the output voltage of the booster circuit sharply increases, thereby generating a load dump surge that comes to the airbag driving circuit. Because the igniting power transistor has been turned on, the load dump surge is applied to a portion between the drain and the source of the current supplying MOS transistor, which has been conducting squib igniting current.

That is, the current supplying transistor has to have a capacitor to conduct both the squib igniting current and the load dump surge current.

This amount current increases the loss of the transistor and makes the size of the current supplying transistor become too large for the driving circuit.

SUMMARY OF THE INVENTION

Therefore, an object of the invention is to provide a compact airbag driving circuit that is provided with a compact current supplying transistor by suppressing the loss of the transistor when the battery voltage sharply increases.

According to a main feature of the invention, a driving circuit for a crew protection device includes a squib for operating the protection device when a preset amount of electric current is supplied thereto from a DC power source, series connected first and second transistors connected between the squib and the DC power source, and transistor control means for controlling the first transistor when a command signal is given thereto. In the above driving circuit, the transistor control means controls the first transistor to pass a first preset amount of electric current if output voltage of the DC power source is higher than a first threshold voltage and to pass an amount of electric current so that the voltage across the first transistor can be set to be equal to or lower than a second threshold voltage if output voltage of the DC power source becomes higher than the threshold voltage.

The transistor control means of the above driving circuit may include a first current control circuit for controlling the first transistor to pass the preset amount of electric current, a voltage control circuit for controlling the first transistor to pass a suitable amount of electric current so that the voltage across the first transistor can be set to be equal to or lower than the first threshold voltage, and a first switchover means for switching connection with the gate of the first transistor from one of the first current control circuit and the voltage control circuit to the other according to the output voltage of the DC power source. If the output voltage of the DC power source is equal to or lower than the first threshold voltage, the first switching means connects the first transistor to the first current control circuit. On the other hand, the first switching means connects the first transistor with the voltage control circuit, if the output voltage of the DC power source is higher than the first threshold voltage.

Preferably, the first threshold voltage is set to be equal to or higher than a normal output voltage of the DC power source, and the second threshold voltage is set to be equal to or lower than the normal output voltage of the DC power source.

The transistor control means of the above driving circuit may control the second transistor to pass a second preset amount of electric current that is not smaller than the first preset amount of electric current if the output voltage of the DC power source is larger than the first threshold voltage.

The transistor control means may preferably include a second current control circuit for controlling the second transistor to pass the second preset amount of electric current, a switching control circuit for turning on the second transistor; and a second switchover means for switching connection with the gate of the second transistor from one of the second current control circuit and the switching control circuit to the other. If the output voltage of the DC power source is equal to or lower than the first threshold voltage, the second switching means connects the second transistor to the switching control circuit. On the other hand, the second switching means connects the second transistor with the second current control circuit, if the output voltage of the DC power source is higher than the first threshold voltage.

BRIEF DESCRIPTION OF THE DRAWINGS

Other objects, features and characteristics of the present invention as well as the functions of related parts of the present invention will become clear from a study of the following detailed description, the appended claims and the drawing.

FIGURE illustrates an airbag driving circuit according to a preferred embodiment of the invention.

DETAILED DESCRIPTION OF THE PREFERRED EMBODIMENTS

A preferred embodiment according to the invention will be described with reference to FIGURE. As shown in FIGURE, an airbag system includes an airbag driving circuit 1, a DC power source 2, and an ignition control circuit 3. The airbag driving circuit 1 is connected to the DC power source 2 to be supplied with ignition current.

The DC power source 2 includes a battery 20 and a booster circuit 21. The battery 20 is a common rechargeable type that provides 12-volt DC power. The positive terminal of the battery 20 is connected to the booster circuit and various electric loads 4, and the negative terminal thereof is grounded. The booster circuit 21 boosts the terminal voltage of the battery 20 up to 25 V, for example. The input terminal of the booster circuit 21 has an input terminal connected to the positive terminal of the battery 20 and an output terminal connected to the driving circuit 1. When a vehicle has a collision, a wire that connects electric loads 4 and the battery 20 may snap due to a collision shock, the terminal voltage of the battery 20 increases due to a dump load surge, so that the output voltage of the booster circuit 21 becomes 35 V, for example.

The ignition control circuit 3 is a circuit for providing an ignition command signal according to various sensor signals and has a pair of output terminals that are connected to the driving circuit 1.

The airbag driving circuit 1 includes a squib 10, a first FET (field effect transistor) 11, a second FET 12, a transistor control circuit 13 etc.

The squib 10 fires to inflate an airbag when electric current flows therethrough. The current flowing through the squib 10 is controlled by the FET 11 and FET 12. The FET 11 has a source connected to an end of the squib 10 and a drain connected to the output terminal of the booster circuit 21 via a current detecting resistor 130. The FET 12 has a drain connected to the other end of the squib 10 and a source connected to the body of a vehicle, to which the negative terminal the battery 20 is connected, via a current detecting resistor 134.

The transistor control circuit 13 includes two current detecting resistors 130, 134, two constant current control circuits 131, 135, a constant voltage control circuit 132, a switching control circuit 133, a voltage detecting circuit 136, two switchover circuits 137, 138, etc.

The resistor 130 converts an amount of the current flowing through the FET 11 to a voltage. The resistor 130 has one end connected to the output terminal of the booster circuit 21 and the other end connected to the drain of the FET 11.

The constant current control circuit 131 controls the FET 11, via the switchover circuit 137, when an ignition command signal is given by the ignition control circuit 3. The constant current control circuit 131 controls the current flowing through the FET 11 or the squib 10 to become a first preset amount of ignition current, such as 1.5 A, according to the voltage across the current detecting resistor 130. The constant current control circuit 131 has three input terminals and one output terminal: one of the input terminals is connected to one of the output terminals of the ignition control circuit 3; the other two input terminals are respectively connected to the opposite ends of the current detecting resistor 130; and the output terminal is connected to the switchover circuit 137.

The constant voltage control circuit 132 controls the drain-source voltage of the FET 11 via the switchover circuit 137 when an ignition command signal is given by the ignition control circuit 3. The constant voltage control circuit 132 controls the drain-source voltage of the FET 11 to a second constant voltage. Incidentally, the second constant voltage may be less than 35 V, or 20 V in this embodiment. The constant voltage control circuit 132 has three input terminals and one output terminals: one of the input terminals is connected to one of the output terminals of the ignition control circuit 3; the other two input terminals are respectively connected to the drain of the FET 11 and the source of the same.

The switching control circuit 133 turns on the FET 12 via the switchover circuit 138 when an ignition command signal is given by the ignition control circuit 3. The switching control circuit 133 has an input terminal connected to the other output terminal of the ignition control circuit 3 and an output terminal connected to the switchover circuit 138.

The current detecting resistor 134 converts an amount of current flowing through the FET 12 to a voltage. The current detecting resistor 134 has one end that is connected to the source of the FET 12 and the other end that is grounded. Both ends of the same are connected to the constant current control circuit 134.

The constant current control circuit 135 controls the FET 12, via the switchover circuit 138, when an ignition command signal is given by the ignition control circuit 3. The constant current control circuit 131 controls the current flowing through the FET 12 and the squib 10 to become a second amount of ignition current according to the voltage across the current detecting resistor 134. The second preset amount of ignition current is set to be not smaller than the first preset amount of ignition current so that the loss of the FET 11 can be not more than the loss thereof when the first preset amount of ignition current flowing therethrough, such as 1.5 A. The constant current control circuit 135 has three input terminals and one output terminal: one of the input terminals is connected to the other output terminal of the ignition control circuit 3; the other two input terminals are respectively connected to the opposite ends of the current detecting resistor 134; and the output terminal is connected to the switchover circuit 138.

The voltage detecting circuit 136 detects the output voltage of the booster circuit 21. The voltage detecting circuit 136 generates a low level voltage signal when the output voltage of the booster circuit 21 is lower than a first threshold voltage, otherwise it generates a high level signal. The first threshold voltage is higher than the output voltage of the booster circuit 21 (e.g. 25 V) and lower than the maximum voltage (e.g. 35 V), such as 27 V. The voltage detecting circuit 136 has an input terminal connected to the output terminal of the booster circuit 21 and an output terminal connected to the switching circuits 137, 138.

The switchover circuit 137 switches over the connection of one of the constant current control circuit 131 and the constant voltage control circuit 132 with the FET 11 to the other according to the output signal of the voltage detecting circuit 136. The switchover circuit 137 has a control terminal connected to the output terminal of the voltage detecting circuit 136, a terminal 137a connected to the output terminal of the constant current control circuit 131, a terminal 137b connected to the output terminal of the constant voltage control circuit 132 and a terminal 137c connected to the gate of the FET 11. When the level of the output signal of the voltage detecting circuit 136 becomes low, the switchover circuit 137 connects the constant current control circuit 131 to the gate of the FET 11. On the other hand, the switchover circuit 137 connects the constant voltage control circuit 132 to the gate of the FET 11 when the level of the output signal of the voltage detecting circuit 136 becomes high.

The switchover circuit 138 switches over the connection with the gate of the FET 12 from one of the switching control circuit 133 and the constant current control circuit 136 to the other according to the output signal of the voltage detecting circuit 136. The switchover circuit 138 has a control terminal connected to the output terminal of the voltage detecting circuit 136, a terminal 138a connected to the output terminal of the switching control circuit 133, a terminal 138b connected to the output terminal of the constant current control circuit 135 and a terminal 138c connected to the gate of the FET 12. When the level of the output signal of the voltage detecting circuit 136 becomes low, the switchover circuit 138 connects the switching control circuit 133 to the gate of the FET 12. On the other hand, the switchover circuit 138 connects the constant current control circuit 135 to the gate of the FET 12 when the level of the output signal of the voltage detecting circuit 136 becomes high.

In operation: when an ignition switch (not shown) is turned on, the output power of the battery 20 is supplied to operate the airbag driving circuit 1, the ignition control circuit 3 and the electric loads 4. The booster circuit 21 provides 25-volt power. Because the output voltage of the booster circuit 21 is not higher than 27 V, the voltage detecting circuit 136 generates a low level signal. Accordingly, the switchover circuit 137 connects the gate of the FET 11 with the constant current control circuit 131, and the switch over circuit 138 connects the gate of the FET 12 with the switching control circuit 133, as shown in FIGURE.

If a vehicle has a collision, the ignition control circuit 3 generates an ignition command signal to inflate an airbag according to related sensor signals.

If any of the wires connecting the electric loads 4 and the battery 20 does not snap off, no load dumper surge is generated, so that the booster circuit 21 maintains its normal voltage of 25 V, resulting in that the switchover circuits 137, 138 do not change operation thereof. The switching control circuit 133 turns on the FET 12 via the switchover circuit 138, and the constant current control circuit 131 controls the FET 11 so that the amount of the current flowing through the FET 11 and the squib 10 can be regulated to the first preset amount of ignition current of 1.5 A. As a result, the squib 10 is powered with 1.5 A current to inflate an airbag. Assuming that: the squib 10 has a resistance of 2 Ω; and the turn-on resistance of the FET 12 is 1 Ω. The loss of the FET 11 and FET 12 are respectively calculated as follows:

(25V−(2Ω+1Ω)×1.5 A)×1.5 A=30.75W

1Ω×1.5A×1.5A=2.25 W

If, on the other hand, any of the wires connecting the electric loads 4 and the battery 20 snaps off, a load damper surge is generated, so that the output voltage of the booster circuit 21 becomes as high as its maximum voltage of 35 V, which is much higher than the first threshold voltage of 27 V. Accordingly, the voltage detecting circuit 136 outputs a high level signal. Then, the switchover circuit 137 connects the gate of the FET 11 with the constant voltage control circuit 132. The switchover circuit 138 also connects the gate of the FET 12 with the constant current control circuit 135. The ignition command signal makes the constant voltage control circuit 132 control the FET 11 so that the drain-source voltage of the FET 11 can be maintained to be 20 V. The ignition command signal also makes the constant current control circuit 135 control the FET 12 so that the current flowing through the FET 12 and the squib 10 can be maintained to be the second amount of ignition current of 1.5 A. As a result, the squib 10 is powered with 1.5 A current to inflate an airbag.

In the meanwhile, the loss of the FET 11 is calculated as follows:

20 V×1.5 A=30 W.

The loss of the FET 12 is also calculated as follows:

(35 V−20 V−2Ω×1.5 A)×1.5 A=18 W

On the other hand, if the FET 12 is turned on and the FET 11 is controlled to pass a constant amount of current regardless of the output voltage of the booster circuit 21 as in the prior art discussed before, the output voltage of the loss of a the FET 11 is calculated as follows:

(35V−(2Ω+1 Ω)×1.5 A)×1.5 A=45.75 W

Because the drain-source voltage of the FET 11 is suppressed to a voltage under 20 V even if the output voltage of the booster circuit 21 rises up to 35 V according to the invention, the loss of the transistor can be significantly reduced.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A driving circuit for a crew protection device connected to
    a DC power source and mounted in a vehicle comprising:
    a squib for operating the protection device when a preset amount of electric current is supplied thereto from said DC power source;
    a first transistor connected between one end of said squib and one end of said DC power source;
    a second transistor connected between the other end of said squib and the other end of said DC power source; and
    transistor control means for controlling said first transistor when a command signal is given thereto;
    wherein said transistor control means controls said first transistor to pass a first preset amount of electric current if output voltage of said DC power source is higher than a first threshold voltage and to pass an amount of electric current so that the voltage across the first transistor can be set to be equal to or lower than a second threshold voltage if output voltage of said DC power source becomes higher than the threshold voltage.

2. The driving circuit as claimed in claim 1, wherein said transistor control means comprises:
    a first current control circuit for controlling said first transistor to pass the preset amount of electric current;
    a voltage control circuit for controlling said first transistor to pass an amount of electric current so that the voltage across the first transistor can be set to be equal to or lower than the first threshold voltage; and
    a first switchover means for switching connection with the gate of said first transistor from one of said first current control circuit and said voltage control circuit to the other according to the output voltage of said DC power source, said first switching means connecting said first transistor to said first current control circuit if the output voltage of said DC power source is equal to or lower than the first threshold voltage and connecting said first transistor with said voltage control circuit if the output voltage of said DC power source is higher than the first threshold voltage.

3. The driving circuit as claimed in claim 1, wherein said first threshold voltage is equal to or higher than a normal output voltage of said DC power source.

4. The driving circuit as claimed in claim 1, wherein said second threshold voltage is equal to or lower than a normal output voltage of said DC power source.

5. The driving circuit as claimed in claim 1, wherein said transistor control means also controls said second transistor to pass a second preset amount of electric current that is not smaller than the first preset amount of electric current if the output voltage of said DC power source is higher than the first threshold voltage.

6. The driving circuit as claimed in claim 5, wherein said transistor control means comprises:
- a second current control circuit for controlling said second transistor to pass the second preset amount of electric current;
- a switching control circuit for turning on said second transistor; and
- a second switchover means for switching connection with the gate of said second transistor from one of said second current control circuit and said switching control circuit to the other, said second switching means connecting said second transistor to said switching control circuit if the output voltage of said DC power source is equal to or lower than the first threshold voltage and connecting said second transistor with said second current control circuit if the output voltage of said DC power source is higher than the first threshold voltage.

7. The driving circuit as claimed in claim 5, wherein the second preset amount of current is set so that the loss of said first transistor caused by the second preset amount of current can be not larger than the loss of said first transistor caused by the first preset amount of current.

* * * * *